US009558122B2

(12) United States Patent
McIntyre

(10) Patent No.: US 9,558,122 B2
(45) Date of Patent: Jan. 31, 2017

(54) CACHE RECLAMATION USING PRIORITIZED RECORD REMOVAL

(71) Applicant: Apple Inc., Cupertino, CA (US)

(72) Inventor: Kristen A. McIntyre, Fremont, CA (US)

(73) Assignee: Apple Inc., Cupertino, CA (US)

( * ) Notice: Subject to any disclaimer, the term of this patent is extended or adjusted under 35 U.S.C. 154(b) by 310 days.

(21) Appl. No.: 14/290,879

(22) Filed: May 29, 2014

(65) Prior Publication Data

US 2015/0347309 A1 Dec. 3, 2015

(51) Int. Cl.
*G06F 12/08* (2016.01)
*G06F 12/12* (2016.01)
*H04L 29/08* (2006.01)

(52) U.S. Cl.
CPC ......... *G06F 12/0864* (2013.01); *G06F 12/121* (2013.01); *H04L 67/2852* (2013.01); *G06F 2212/1044* (2013.01); *G06F 2212/251* (2013.01); *G06F 2212/604* (2013.01); *G06F 2212/69* (2013.01)

(58) Field of Classification Search
None
See application file for complete search history.

(56) References Cited

U.S. PATENT DOCUMENTS

| | | | | | |
|---|---|---|---|---|---|
| 5,566,315 | A | * | 10/1996 | Milillo | G06F 12/0866 710/56 |
| 6,243,667 | B1 | * | 6/2001 | Kerr | H04L 45/00 370/379 |
| 8,108,610 | B1 | * | 1/2012 | Glasco | G06F 12/08 711/118 |
| 9,239,790 | B1 | * | 1/2016 | Banerjee | G06F 12/0808 |
| 2003/0084249 | A1 | * | 5/2003 | Johnson | G06F 12/123 711/133 |
| 2003/0084251 | A1 | * | 5/2003 | Gaither | G06F 12/0804 711/133 |
| 2004/0073707 | A1 | * | 4/2004 | Dillon | H04L 29/12009 709/245 |

(Continued)

OTHER PUBLICATIONS

*Page Replacement Algorithm.* Wikipedia, the Free Encyclopedia. Last updated Apr. 11, 2014. Retrieved on Dec. 3, 2014. Retrieved from the Internet: URL<http://en.wikipedia.org/w/index.php?title=Page_replacement_algorithm&oldid=603755055>. 12 pages.

*Primary Examiner* — Michael Krofcheck
(74) *Attorney, Agent, or Firm* — Fish & Richardson P.C.

(57) ABSTRACT

In an example implementation, a method includes receiving an indication to reclaim memory from a cache, the cache including a plurality of data buckets each configured to store one or more records and corresponding access bits. The method also includes selecting a data bucket from the cache, and processing the selected data bucket. Processing the selected data bucket includes determining access bits of the selected data bucket that are clear, and expunging data records corresponding to those access bits from the cache. Processing the selected data bucket also includes determining access bits of the selected data bucket that are set and do not correspond to records relevant to outstanding requests by a process utilizing the cache, and clearing those access bits. The method also includes repeating selecting and processing data buckets until a stop criterion is satisfied.

48 Claims, 8 Drawing Sheets

(56) References Cited

U.S. PATENT DOCUMENTS

| | | | |
|---|---|---|---|
| 2005/0102486 A1* | 5/2005 | Lakshmanamurthy | G06F 12/0811 712/1 |
| 2007/0186048 A1* | 8/2007 | Nakanishi | G06F 12/0862 711/137 |
| 2009/0327646 A1* | 12/2009 | Jordan | G06F 12/1036 711/207 |
| 2010/0082907 A1* | 4/2010 | Deolalikar | G06F 12/0888 711/133 |
| 2010/0299667 A1* | 11/2010 | Ahmad | G06F 12/1018 718/1 |
| 2011/0072218 A1* | 3/2011 | Manne | G06F 12/0862 711/136 |
| 2014/0281264 A1* | 9/2014 | Duluk, Jr. | G06F 12/08 711/135 |

* cited by examiner

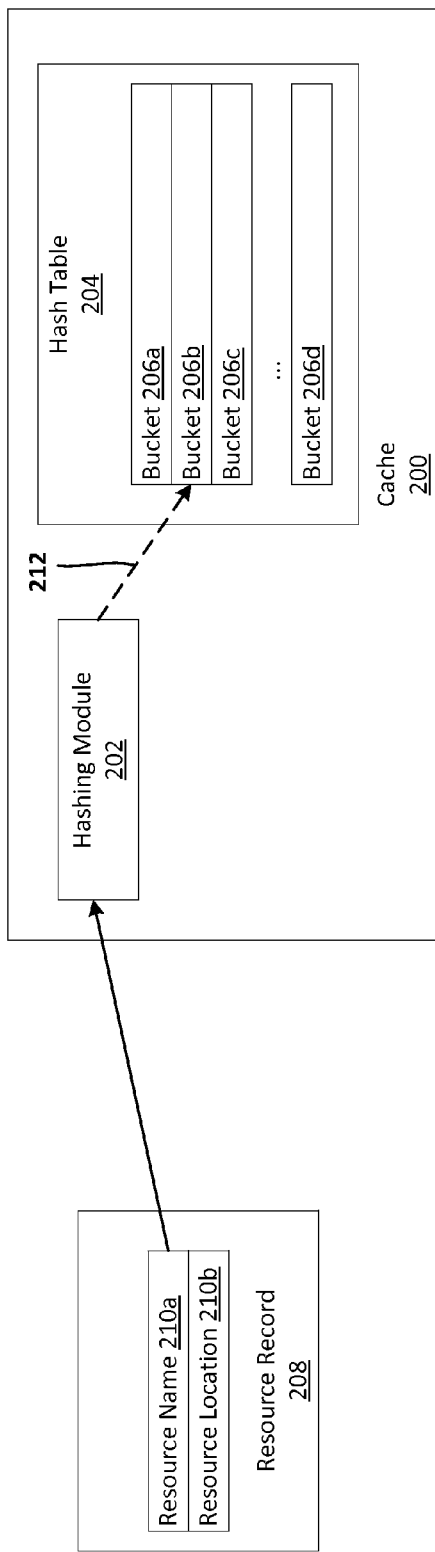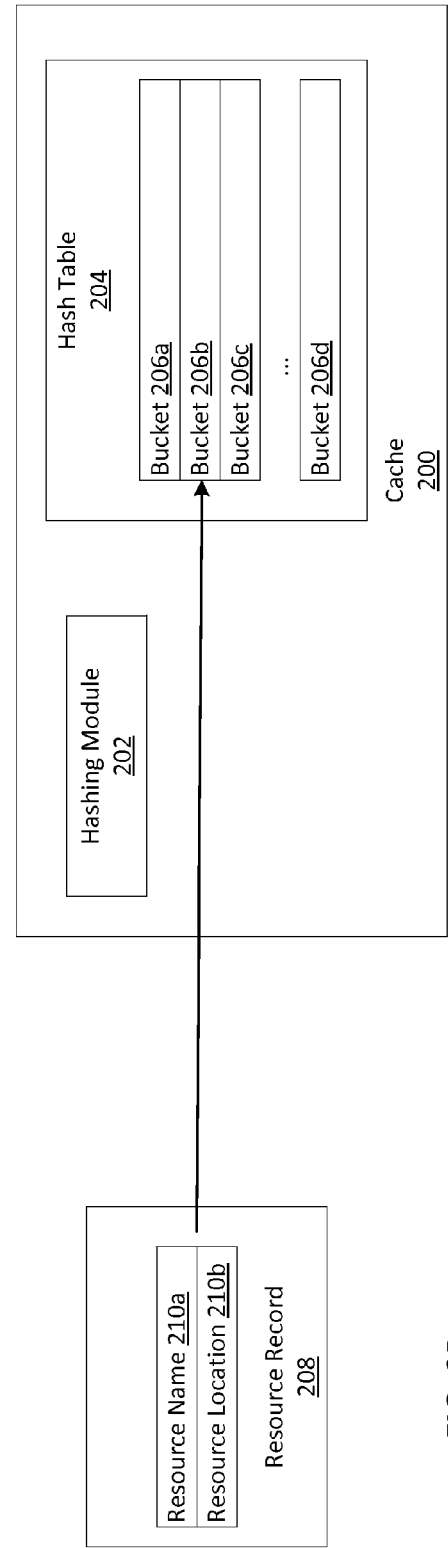

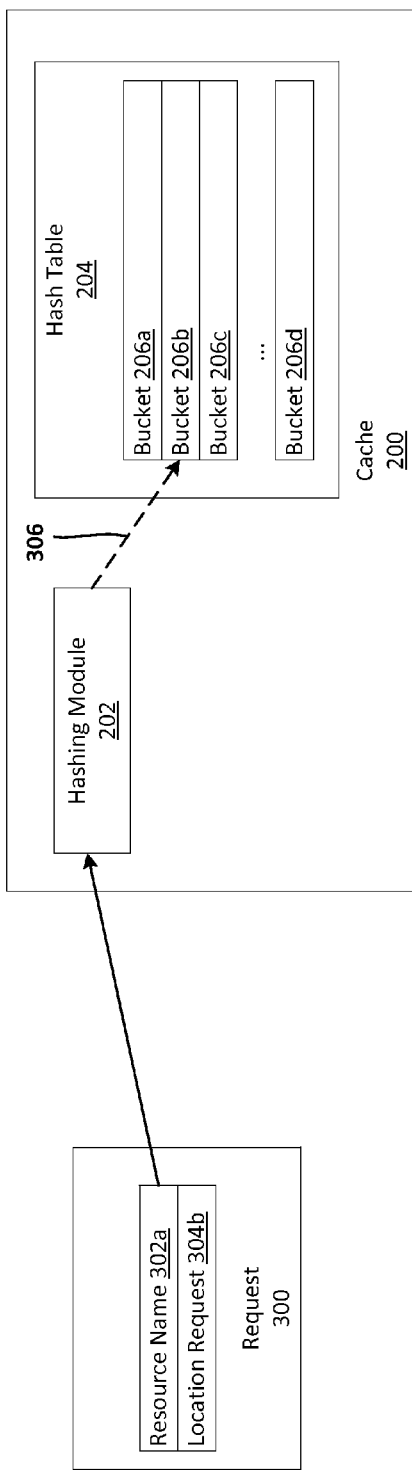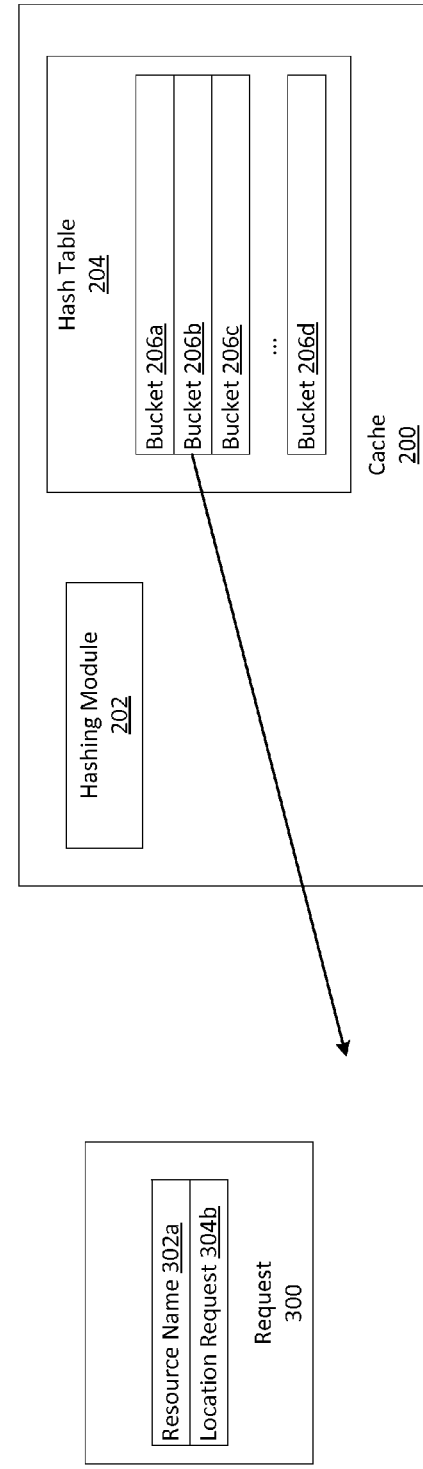
FIG. 3A
FIG. 3B

CACHE RECLAMATION USING PRIORITIZED RECORD REMOVAL

TECHNICAL FIELD

This disclosure relates generally to reclaiming memory from a cache.

BACKGROUND

In computing, a cache is a component that stores data so that future requests for that data can be served faster. The data that is stored within a cache might be, for example, values that have been computed earlier, records that have been previously retrieved, or duplicates of original information that are stored elsewhere (e.g., on another component or system). If requested data is contained in the cache, the request can be served by reading the cache, which might be comparatively faster than re-computing the requested data or re-retrieving the requested data from its original location. Due to system constraints (e.g., memory or storage limitations), a cache often can only store a finite amount of data. In order to make room for additional data, portions of the cache can be "reclaimed," for example by expunging unused or low priority data from the cache.

SUMMARY

Systems, methods, and computer program products for reclaiming memory from a cache. During use, a cache accumulates data (e.g., data records) in anticipation for future retrieval. However, in some implementations, the cache might be suited to only store a finite amount of data. In order to make room for addition data, portions of the cache can be reclaimed for future use, for example by expunging unused or low priority data from the cache. In some implementations, an access bit associated with each data record can be used to identify records that have been recently accessed, and are accordingly of relatively high priority. Access bits can be set and cleared in a manner that reflects each record's importance, and can be used to prioritize the removal of data that is relatively unimportant over the removal of data that is relatively more important.

In general in an aspect, a method includes receiving, by one or more processors, an indication to reclaim memory from a cache, the cache including a plurality of data buckets each configured to store one or more records and corresponding access bits. The method also includes selecting, by one or more processors, a data bucket from the cache, and processing, by one or more processors, the selected data bucket. Processing the selected data bucket includes determining access bits of the selected data bucket that are clear, and expunging data records corresponding to those access bits from the cache. Processing the selected data bucket also includes determining access bits of the selected data bucket that are set and do not correspond to records relevant to outstanding requests by a process utilizing the cache, and clearing those access bits. The method also includes repeating selecting and processing data buckets until a stop criterion is satisfied.

Implementations of this aspect may include one or more of the following features:

In some implementations, processing the selected data bucket further includes determining access bits of the selected data bucket that are set and clearing those access bits, based on an indication of a memory constraint.

In some implementations, the cache is a domain name system cache, or a multicast domain name system cache.

In some implementations, the cache includes a hash table, and each bucket of the cache corresponds to an output of a hash function. In some cases, each bucket includes a linked list.

In some implementations, selecting a data bucket from the cache includes selecting a random data bucket from the cache, where repeating selecting and processing data buckets until a stop criterion is satisfied includes repeating selecting and processing random data buckets until a stop criterion is satisfied. In some cases, selecting a random data bucket from the cache includes selecting a random data bucket based on an output of a pseudo-random number generator. In some implementations, the output of the pseudo-random number generator corresponds to a substantially uniform probability distribution.

In some implementations, each record includes a resource name and a resource location. The resource location can be an internet protocol address.

In some implementations, the stop criterion corresponds to a desired number of records stored in the cache. In some cases, the stop criterion corresponds to a desired amount of memory that is allocated to the cache. In some cases, the memory constraint corresponds to a desired number of records stored in the cache. In some implementations, the memory constraint corresponds to a desired amount of memory that is allocated to the cache.

Other implementations are directed to systems, devices and non-transitory, computer-readable storage mediums.

Particular implementations disclosed herein provide one or more of the advantages. For example, in some implementations, memory can be reclaimed from a cache in a manner that prioritizes the removal of certain data records over others, such that data records that are of relatively higher importance are more likely to be preserved. For example, memory can be reclaimed by prioritizing the removal of data records that have not been recently accessed over the removal of data records that have been recently accessed. Further in some implementations, memory from a cache can be reclaimed differently based on various criteria or constraints, such that data records are preserved or removed based on the immediate or anticipated needs of a particular system.

The details of the disclosed implementations are set forth in the accompanying drawings and the description below. Other features, objects and advantages are apparent from the description, drawings and claims.

DESCRIPTION OF DRAWINGS

FIGS. 2A-C are block diagrams illustrating an example of storage of data into a cache.

FIGS. 3A-B are blocks diagram illustrating an example of reading data from a cache.

The same reference symbol used in various drawings indicates like elements.

DETAILED DESCRIPTION

Example System

FIGS. 1A-D illustrate an example system 100 of interconnected computing devices 102a-d. In this example, the devices 102a-d are connected via a network 104. The network 104 provides data interconnectivity to each of the devices 102a-d, and allows each of the devices 102a-d to transmit data to and receive data from each other. The system 100 is a conceptual diagram useful for describing the disclosed implementations. In practice, the system 100 can include any number of devices that are interconnected by any number of networks in any number of arrangements.

In some implementations, in order for one device (e.g., the device 102a) to communicate specifically with a target device (e.g., the device 102d), information regarding the location of the target device must be known. Location information can include, among other things, a network address that identifies a particular node or network interface of a network. Examples of location information include internet protocol (IP) addresses, Internetwork Packet Exchange (IPX) addresses, network layer addresses, media access control (MAC) addresses, and host addresses.

Figure 1A:
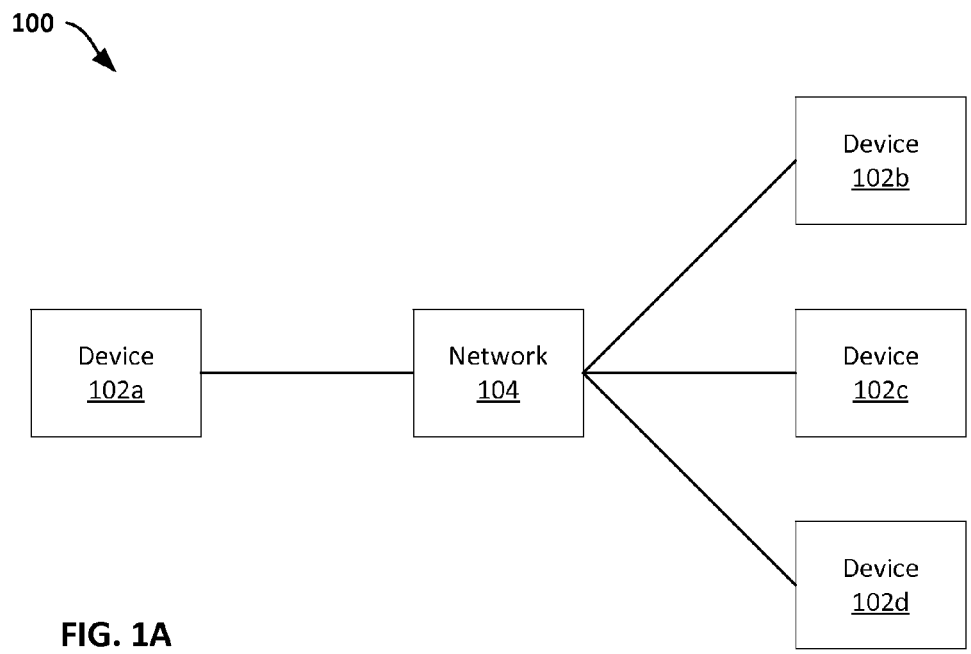
FIG. 1A is a block diagram of an example system of interconnected computing devices.
Figure 1B:
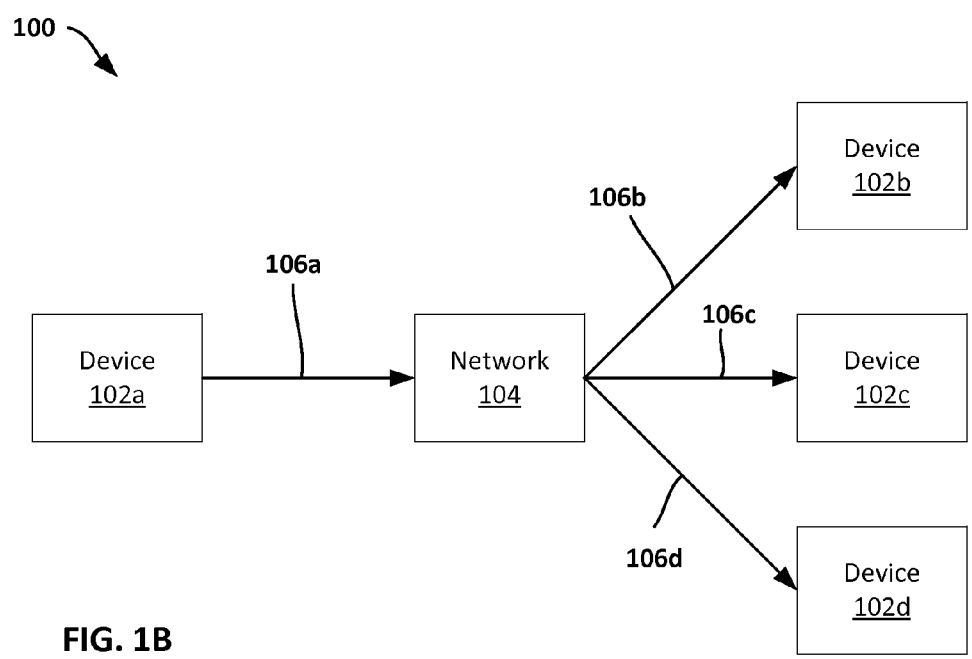
FIGS. 1B-D are block diagrams illustrating an example exchange of data between interconnected computing devices.

A device can determine location information corresponding to the target computing device in a variety of ways. As an example, a device can retrieve information (e.g., location information) using a multicast domain name system (mDNS) service (e.g., Bonjour). As shown in FIG. 1B, in an example implementation, a device 102a can attempt to retrieve location information concerning a target device 102d by broadcasting a multicast query message 106a to the network 104, requesting the location of the device 102d. The multicast query message 106a is transmitted non-specifically to the other devices 102b-d that are connected to the network 104 (as indicated by the arrows 106b-d), such that each device 102b-d receives a copy of the query message.

Figure 1C:
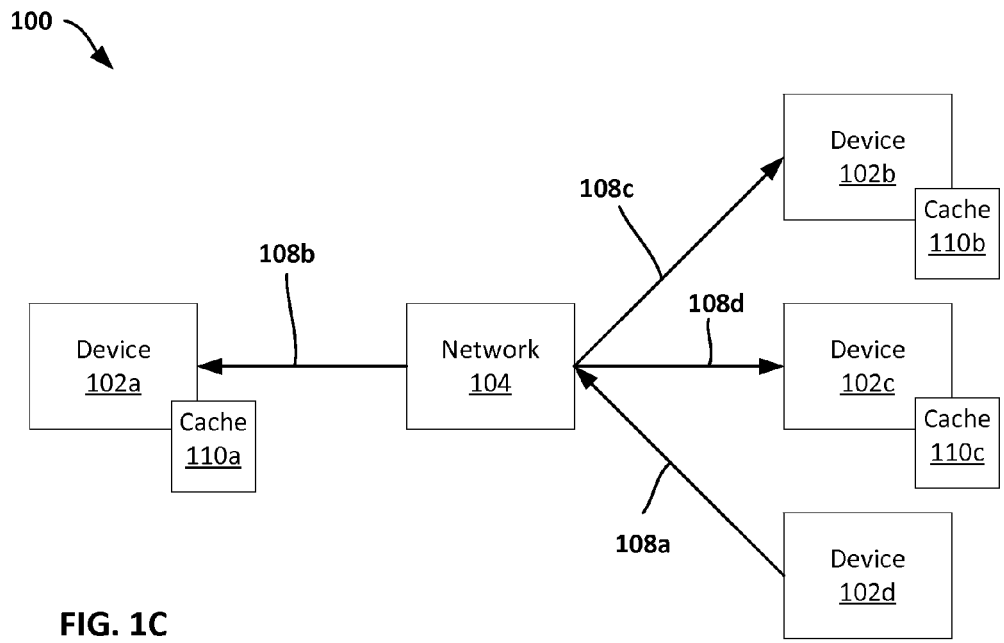

As shown in FIG. 1C, in response, the target device 102d broadcasts a multicast response message 108a to the network 104. The response message 108a includes identifying information and location information regarding the target device 102d (e.g., the name and network address of the computing device 102d). In a similar manner as the multicast query message 106a, the multicast response message 108a is transmitted non-specifically to the other computing devices 102a-c that are connected to network 104, such that each device 102a-c receives a copy of the response message (as indicated by the arrows 108b-d). Upon receipt of the response message, each device 102a-c saves the received information into a cache 110a-c located on each computing device. In this manner, each device 102a-c saves a local copy of the location information pertaining to the computing device 102d.

Figure 1D:
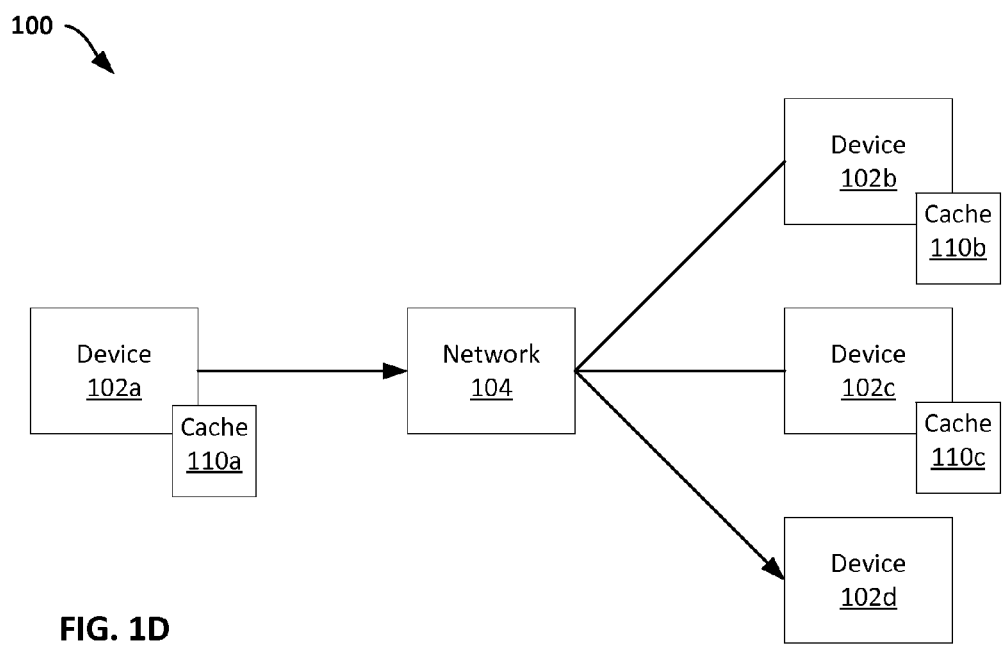

Referring to FIG. 1D, the device 102a transmits data specifically to the device 102d by referencing the location information regarding the device 102d stored in the cache 110a. Though the devices 102b-c did not specifically request location information from the device 102d, each device 102b-c also has this location information saved to their respective local caches 110b-c. Thus, should the devices 102b-c also wish to communicate specifically with the device 102d, the pertinent location information can be retrieved from the caches 110b-c instead of re-requesting the location information directly from the device 102d. By locally caching this information, each of the devices 102a-d can fulfill subsequent communication requests more quickly, and the overall network traffic on the network 104 can be reduced.

The devices 102a-d can be any computing devices that process, transmit, and/or receive data. As examples, the devices 102a-d can be personal computers, mobile devices (e.g., cellular telephones, tablet computers, PDAs, smartphones, and so forth), client computers, server computers, or other electronic devices capable of transmitting or receiving data.

The network 104 can be any data communications network that provides data interconnectivity between computing devices. As an example, the network 104 can be a local area network (LAN), a Wi-Fi network, a wide-area network (WAN), the Internet, a cellular telephone network, a Bluetooth network, or any other wired or wireless data communications network.

Although the above example shows data as being cached on each device of the network, data need not be cached in this manner. For example, in some implementations, only a subset of the devices of the network might cache resource information. Further, while the above example shows how resource information might be requested and fulfilled using mDNS service, this is only one example implementation. Accordingly, in some cases, resource information might be requested and fulfilled using other techniques. As an example, in some implementations, one or more devices might maintain a cache of resource information pertaining to the other devices of the network, and might transmit resource information to other devices in response to received requests. As an example, resource information might be maintained, requested, and transmitted using a traditional domain name system (DNS) service, in which one or more centralized devices (e.g., a server computer) maintain a cache of resource information, and serve portions of the resource information upon request.

Caches can be implemented in a variety of ways. As an example, referring to FIG. 2A, a cache 200 might include a hashing module 202 and a hash table 204. The hash table 204 includes several buckets 206a-d for storing data. When a resource record 208 is input into the cache 200, the cache 200 identifies an appropriate bucket 206a-d of the hash table 204 in which to save data from the resource record 208, and saves the data into the appropriate bucket 206a-d for future retrieval.

A resource record might contain information pertaining to the identity and location of a device on a network. For instance, in example system 100, a resource record can include location information corresponding to a multicast response messages 108a-d. A resource record might include one or more data fields for storing different types of data. For example, the resource record 208 might include a data field 210a that contains information regarding the identity of a particular resource (e.g., the name of a particular device), and a data field 210b that contains information regarding the location to that resource (e.g., the network address of that device). In some implementations, a resource record might also include other fields of information, for example, a list of services that are available on that particular resource.

Upon receipt of the resource record 208, the cache 200 identifies a suitable location in the hash table 204 in which to store data from the resource record 208. As an example, the cache 200 might include a hash module 202 that produces a mathematical hash value based on information from the resource record. As shown in FIG. 2A, a hash module can calculate a hash value based on the name of the resource (e.g., the data contained within data field 210a). The hash module 202 need not use all of the data contained within a data field. As an example, the hash module 202 might produce a hash value based on a portion of the data (e.g., the first N characters of the data field 210a). The hash module 202 can produce a hash value using any number of mathematical hashing techniques, for example by using a hashing function. Example hashing functions include cyclic redundancy check (CRC) functions, checksum functions, non-cryptographic hash functions (e.g., XOR hashing), and cryptographic hash functions (e.g., MD5 or SHA-512).

The produced hash value acts as a "key," and identifies a particular bucket of the hash table. For example, in some implementations, a portion of the hash value (e.g., the final N digits of the hash value) might correspond to a unique bucket within the hash table 204. In some implementations, a module (e.g., processing module that performs a modulo operation) can be used to convert the hash value into a corresponding bucket identification value. In the example shown in FIG. 1A, by inputting data from the resource name field 210a into the hashing module 202, the module outputs a key 212 that identifies the bucket 206b of the hash table 204.

As shown in FIG. 2B, the data from the resource record 208 is then stored in the identified bucket. As an example, data from the resource name field 210a and the resource location field 210b can be stored in bucket 206b of the hash table 204 for future retrieval. In addition to information from the resource record, the cache 200 can also store additional data corresponding to each stored record. As an example, the cache 200 can also store one or more "access bits" associated with each record. These access bits can indicate if a corresponding record has been recently modified and/or accessed from the cache. In another example, the cache 200 can also store information regarding the intended lifespan of each stored record (e.g., a "time to live" value indicating the length of time for which the stored record is valid). As another example, the cache 200 can store information regarding services offered by each resource (e.g., printers, scanners, media streaming modules, other peripherals or services, and so forth). The cache 200 can store other additional data, depending on the implementation.

Figure 2C:
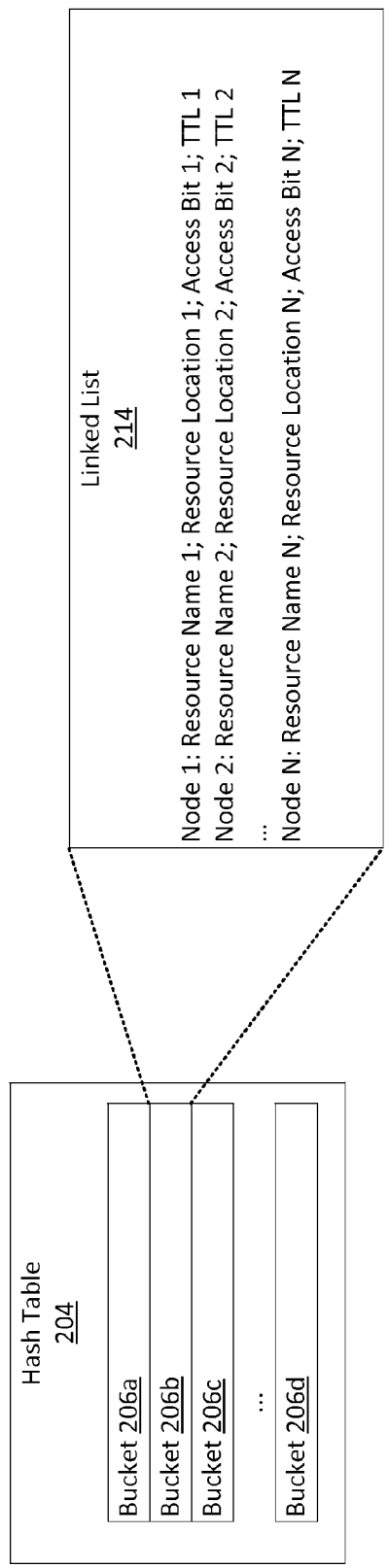

In some implementations, the hashing module 202 might produce hash "collisions." That is, the hashing module 202 might output identical hash values for each of multiple unique inputs. In these implementations, two unique resource records might result in the same key value, and as a result could be saved in the same bucket of the hash table. To account for hash collisions, in some implementations, each bucket might include a data structure (e.g., a linked list) that can store information from more than one record at a time. As an example, as shown in FIG. 2C, the bucket 206b of the hash table 204 might include a linked list 214. The listed list 214 can store data from each of multiple resource records in a corresponding node. Each node can also store other information associated with each record (e.g., access bits or TTL values). In this manner, data from unique resource records can be stored as unique entries within the same bucket.

Data can also be retrieved from the cache 200 using the hashing module 202. For example, as shown in FIG. 3A, a request 300 might include the name of a desired resource (e.g., a data field 302a) and a request for the resource's location (e.g., a data field 302b). To retrieve the requested data from the cache, the hashing module 202 can determine a "key" by calculating a hash value based on the name of the desired resource (e.g., using all or part of the information from data field 302a). In a manner similar as above, hashing module 202 calculates a key value 306 that identifies a bucket of the hash table 204 (e.g., the bucket 206b). Referring to FIG. 3B, data stored in the identified bucket 206b is then retrieved to fulfill the request. In implementations where buckets 206a-d contain data structures for storing information from more than one record at a time (e.g., a linked list), each record of a bucket can be parsed to identify the requested record. As an example, in some implementations, if bucket 206b contains a linked list having multiple nodes, each node containing a different record, the requested record can be identified by parsing the resource names contained in each node to find a match. The matching record can then be retrieved to fulfill the request.

During use, the cache 200 accumulates data in anticipation for future retrieval. However, in some implementations, the cache 200 might be suited to only store a finite amount of data. As an example, the cache 200 might be constrained by a limited amount of available memory or storage space in which to store data. These constraints might be based on limitations of the device implementing cache 200 (e.g., based on finite available resources available to a device that implements cache 200), limitations that have been designed into cache 200 (e.g., designed restrictions that define the number of records that can be stored by the cache 200, or the storage space or memory that can be utilized by the cache 200), or both. In these implementations, in order to make room for additional data, portions of the cache can be "reclaimed" for future use, for example by expunging unused or low priority data from the cache.

Unused or low priority data can be identified in a variety of ways. For instance, the access bit of each record can be used to identify records that have been recently accessed, and are accordingly of relatively high priority. Access bits can be set and cleared in a manner that reflects each record's importance. As an example, when a particular data record is initially written into a cache, the cache might store a cleared access bit (e.g., a value of 0) in association with the stored record. When the record is accessed (e.g., when the record is subsequently retrieved in order to fulfill a request, or when the record is retrieved for other purposes, for instance to test if the record exists in the cache), the access bit might be set (e.g., changed to a value of 1), indicating that the record had been requested in the past, and thus is of relatively higher priority. Accordingly, when an indication is received to reclaim portions of the cache, expunging of records with cleared access bits (indicating that the records have not been previously accessed) might be prioritized over expunging records with set access bits (indicating that the records have been previously accessed). In some implementations, access bits can be periodically cleared (e.g., according to particular time criteria), intermittently cleared (e.g., according to particular system parameter criteria or user-initiated commands), or cleared according to some other criteria (e.g., randomly). In this manner, access bits can indicate if the records have been recently accessed (e.g., since the last time the access bits were cleared), and can be used to assess the relative importance of each record.

Figure 4:
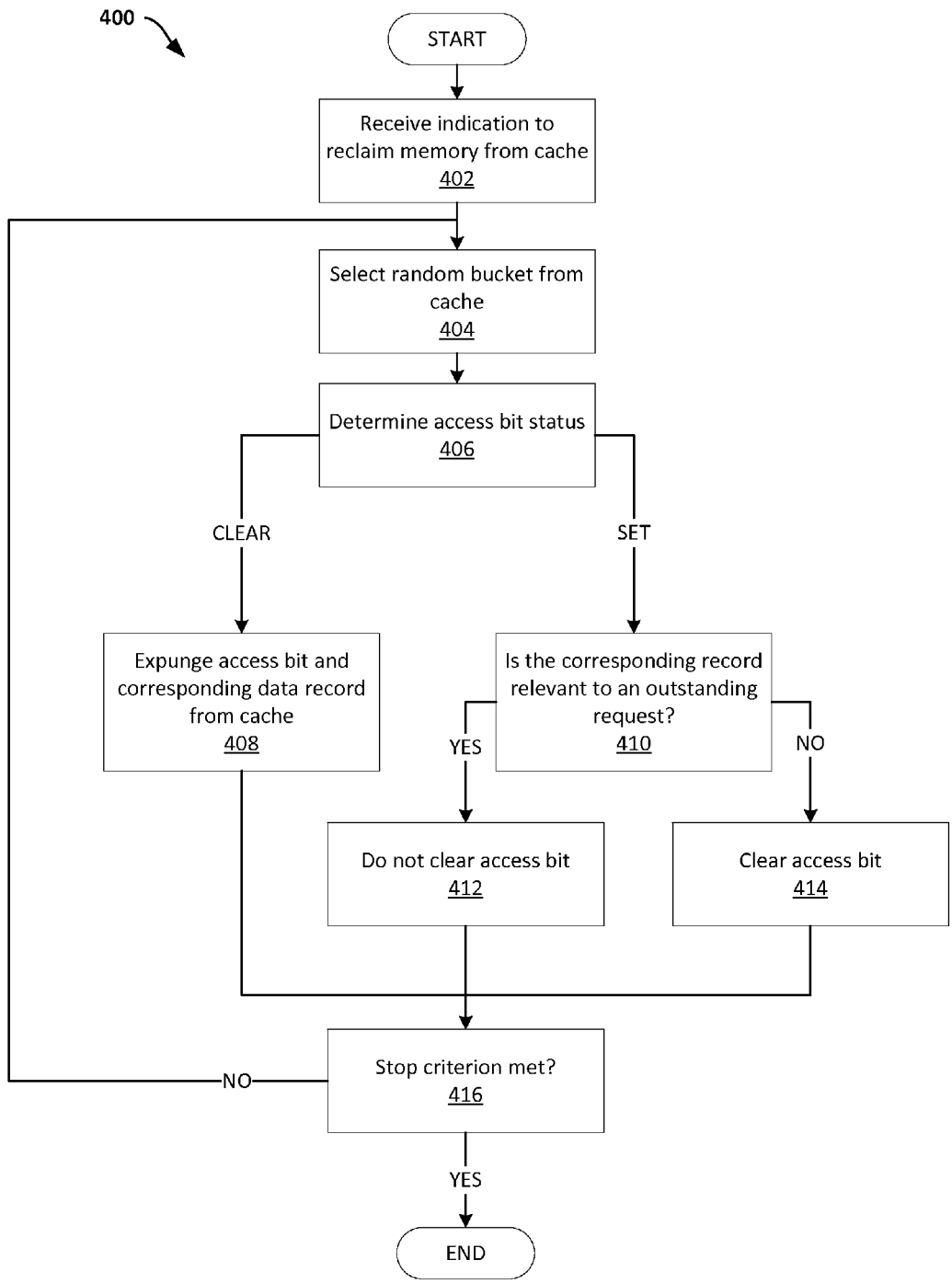
FIG. 4 is a flow chart of an example process of reclaiming memory from a cache.

An example process 400 for reclaiming memory from a cache is shown in FIG. 4. The process 400 can be used, for example, to reclaim memory from the caches 110a-c of FIG. 1C or the caches 200 of FIGS. 2A-C and FIGS. 3A-B.

The process 400 begins by receiving an indication to reclaim memory from a cache (step 402). This indication can be received, for example, by the cache, a device or system on which the cache is implemented, or a device or system in communication with the cache. An indication can be, for example, an instruction or command sent from a device or system, a component of a device or system, or the cache itself to reclaim memory from the cache. In some implementations, the indication to reclaim memory from the cache might be sent when certain criteria are met. As an example, an indication to reclaim memory from the cache might be sent based on a determination that the cache has grown too large (e.g., a determination that the cache contains too many records, or consumes too much memory or storage space). As another example, an indication to reclaim memory from the cache might be sent periodically (e.g., according to particular time criteria, such as after a particular time has elapsed since the last indication was sent). As another example, an indication to reclaim memory from the cache might be sent in response to a user-initiated command. As another example, an indication to reclaim memory from the cache might be sent based on a determination that a device or system is under memory pressure (e.g., when a device or system is running low on memory, or when the amount of available memory on the device or system decreases below a particular threshold).

Upon receipt of the indication to clear memory from the cache, a random bucket from the cache is selected (step 404). As an example, referring to cache 200 of FIG. 2A, a bucket can be selected from among all of the buckets 206a-d of the hash table 204. A bucket can be randomly selected using techniques for randomly selecting one element from among a set. As an example, a bucket can be randomly selected using a random number generator (RNG), a computational or physical device designed to generate a sequence of numbers or symbols that lack any pattern (i.e., appear random). An RNG need not be a "true" random number generator, and can be, for example, a pseudo-random number generator (PRNG) that generates a sequence of numbers that approximates the properties of random numbers. Example RNGs and PRNGs include Mersenne twister-based PRNGs, xorshift-based PRNGs, and RNGs that harvest entropy from natural sources (e.g., based on observations of physical phenomena). The output of the RNG or PRNG can vary, depending on the application. In some implementations, the output of RNG or PRNG can be a substantially uniform distribution, such that the output values are uniformly distributed within a particular range of values; correspondingly, in some implementations, a bucket of the cache can be randomly selected such that each bucket of the cache has an approximately equal chance of being selected. In some implementations, the output of the RNG or PRNG can have non-uniform distributions (e.g., a Gaussian distribution); correspondingly, in some implementations, a bucket of the cache can be randomly selected where some buckets have a greater chance of being selected than others.

Once a bucket has been selected, the status of the selected bucket's access bit is determined (step 406). For example, referring to the cache 200 of FIG. 2A, the selected bucket 206a-d is parsed and the status of the access bit stored within it is determined (i.e., it is determined whether the access bit is "set" or "clear").

If the access bit of the selected bucket is "clear," in response, the access bit and its corresponding data record are expunged from the cache (step 408). Expunging can include, for example, removing the access bit and the corresponding data record from the cache and making its consumed memory or storage space once again available for use. In some implementations, expunging can include overwriting the access bit and corresponding data record (e.g., with zeros or other information) and making its consumed memory or storage space once again available for use. In some implementations, expunging can include simply indicating that its consumed memory or storage space is once again available for use.

If the access bit of the selected bucket is "set," in response, it is determined if the corresponding record is relevant to an outstanding request by one or more processes (step 410). As an example, a record might be considered relevant if there is an outstanding request for access to that record (e.g., if there is an access request for the record that has not yet been fulfilled). As another example, a record might be considered relevant if there is an outstanding request for information contained within that record. For instance, if a record describes the identity of a device, the location of the device, and a service offered by the device, the record might be relevant to a request for the identity and location of a device that provides that particular service. In some implementations, this can be implemented by comparing the record against a list of outstanding requests. For example, if the record contains data (e.g., a resource name or service) that substantially matches data on the list of outstanding requests, then it is determined that the record is relevant to the outstanding request. In some implementations, the relevance of a record can be determined by "calling out" the contents of the record (e.g., using an appropriate function that requests information regarding the relevance of the data record) and determining if the record is relevant to an outstanding request based on the result. As an example, a call out request can include an indication of a particular data record as an input parameter, and can output a relevance metric regarding that data record. In some implementations, the result of "calling out" (e.g., the outputted relevance metric) can be binary information. For example, the result might indicate if the record is either relevant or not relevant. In some implementations, the result of "calling out" can provide more granular information. For example, the result might indicate the relative relevance of the record (e.g., provide a relevance "score" or other metric that defines the relative relevance of the record). In these implementations, the cache might determine if a record is relevant or not relevant by determining if the returned relevance "score" or metric is greater than or less than a particular threshold value.

If it is determined that the record is relevant to an outstanding request, the access bit is not cleared (i.e., is maintained as "set") (step 412).

If it is determined that the record is not relevant to any outstanding request, the access bit is cleared (step 414).

Upon competition of steps 408, 412, or 414, it is determined if a particular stop criterion is met (step 416). Stop criteria can include, for example, a requirement that a particular number of records be expunged, a requirement that a particular amount of storage space or memory be reclaimed, a requirement that a particular number of records be maintained on the cache, a requirement that the number of records maintained on the cache does not exceed a particular amount, or other criteria. If the stop criteria has been met (e.g., indicating that a sufficient amount of the cache has been reclaimed), process 400 ends. If the stop criteria has not been met (e.g., indicating that additional portions of the cache need to be reclaimed), the process continues again with the selection of another random bucket (stop 404). In this manner, the reclamation process 400 will continue selecting random buckets, determining the status of access bits within the selected buckets, expunging the contents of the selected buckets, and/or clearing access bits of the selected buckets until a satisfactory amount of the cache has been reclaimed.

Implementations of the process 400 can also be used in cases where data from multiple records are stored in each bucket of the cache (e.g., the cache 200 of FIG. 2C). In these implementations, when a particular bucket is randomly selected, each of the access bits and records of the selected bucket can be read and processed as described in the steps 406, 408, 410, 412, and 414. For example, if a selected bucket has multiple records and corresponding access bits stored within it, the process shown in the steps 406, 408, 410, 412, and 414 can be carried out for each of the records and access bits of the bucket. That is, each access bit is individually parsed, and may be individually expunged along with its corresponding data record, individually cleared, or individually maintained. Accordingly, in some implementations, even if a selected bucket contains multiple records and access bits, not all records contained within the bucket need to be unilaterally expunged, nor do all of the access bits within the bucket need to be unilaterally cleared or unilaterally maintained.

In some implementations, portions of the process 400 can be modified to accommodate certain circumstances. For example, in some implementations, the steps 410 and 412 can be excluded, such that if it is determined that an access bit is set (step 406), then the access bit is cleared (step 414), regardless if the corresponding record is relevant to an outstanding request. In some implementations, the steps 410 and 412 can be excluded selectively. As an example, in some cases, the steps 410 and 412 can be excluded based on a constraint that requires a particular number of records to be free, or a certain amount of storage or memory be available for use. If the constraint is met (e.g., if a specified number of records are free or if a specified amount of storage or memory is available for use), then the steps 410 and 412 might be undertaken. If the constraint is not met (e.g., if the specified number of records are not free or if the specified amount of storage or memory is not available for use), then the steps 410 and 412 might be excluded; accordingly, if it is determined than an access bit is set, then the access bit is cleared, regardless if the corresponding record is relevant to an outstanding request. In this manner, access bits can be cleared or maintained according to different strategies depending on the current state of the system and the amount of resources available to the system.

As another example, in some implementations, process 400 can be modified such that the determination of whether a record is relevant to an outstanding request (e.g., as described in step 410) can instead occur upon determining that an access bit is clear (e.g., as described in step 406). For example, after determining that an access bit is clear, in response, it determined if the corresponding record is relevant to an outstanding request. This can be performed, for example, by calling out the record, as described above. Upon determining that the record is not relevant to an outstanding request, the record and its corresponding access bit are expunged from the cache (e.g., as described in step 408). Upon determining that the record is relevant to an outstanding request, the record is preserved. In some implementations, determining whether a record is relevant to an outstanding request can be performed upon determining that an access bit is clear, upon determining that an access bit is set, or both. As above, in some implementations, the step of determining whether a record is relevant to an outstanding request can be selectively excluded based on various criteria, for example based a constraint that requires a particular number of records to be free, or a certain amount of storage or memory be available for use.

As another example, in some implementations, process 400 can be modified such instead of selecting random data buckets from the cache (e.g., as described in step 404), data buckets are selected sequentially from the cache. As an example, data buckets can be arranged in a particular order, and one particular data bucket (e.g., the first data bucket) can be selected for processing by steps 406, 408, 410, 412, and/or 414. Upon completing these steps, and upon determining that the stop criterion has not been met (e.g., as described in step 416), another data bucket can be selected sequentially from the cache (e.g., the next data bucket in the order). In some implementations, an indication of the last data bucket that was processed by process 600 can be retained, such that if process 600 is subsequently performed again, the next data bucket in the sequence can be recalled and selected for processing.

In some implementations, the process 400 can be used in conjunction with other cache reclamation techniques. For example, in implementations where each stored record has an associated TTL value, upon receiving an indication to reclaim memory, the cache might first parse each record stored in the cache in order to find records that have expired (i.e., records which have a lapsed TTL). If, after this process, a stop criterion has not been met (e.g., an insufficient number of records were reclaimed), that the process 400 can continue reclaiming memory until the stop criterion a met.

Implementations of process 400 can provide certain benefits. For example, in some implementations, memory can be reclaimed from a cache in a manner that prioritizes the removal of certain data records over others, such that data records that are of relatively higher importance are more likely to be preserved. For example, memory can be reclaimed by prioritizing the removal of data records that have not been recently accessed over the removal of data records that have been recently accessed. Further, in some implementations, memory from a cache can be reclaimed differently based on various stop criteria or memory constraints, such that data records are preserved or removed based on the immediate or anticipated needs of a particular system. Further still, in some implementations, by randomly selecting data buckets for processing (e.g., as described in step 404), data buckets might be processed more effectively compared to other data bucket selection techniques. However, selecting data buckets using other techniques (for example sequential selection), might also be beneficial under certain circumstances. Accordingly, implementations of process 400 can differ, depending on each particular application.

Although implementations of the process 400 are described in the context of reclaiming memory from caches used to store resource records, implementations of the process 400 are not limited solely to this application. In some implementations, the process 400 can be adapted for use in applications pertaining to page replacement (e.g., paging in virtual memory management), or another other applications in which stored information must be reclaimed in order to accommodate additional information. Similarly, the process 400 is not limited solely to implementations of caches with hash tables, and can be adapted for use with any other mechanism for storing cached data (e.g., arrays, tables, or other data structures that are indexed by values other than a hash).

Example Client Architecture

Figure 5:
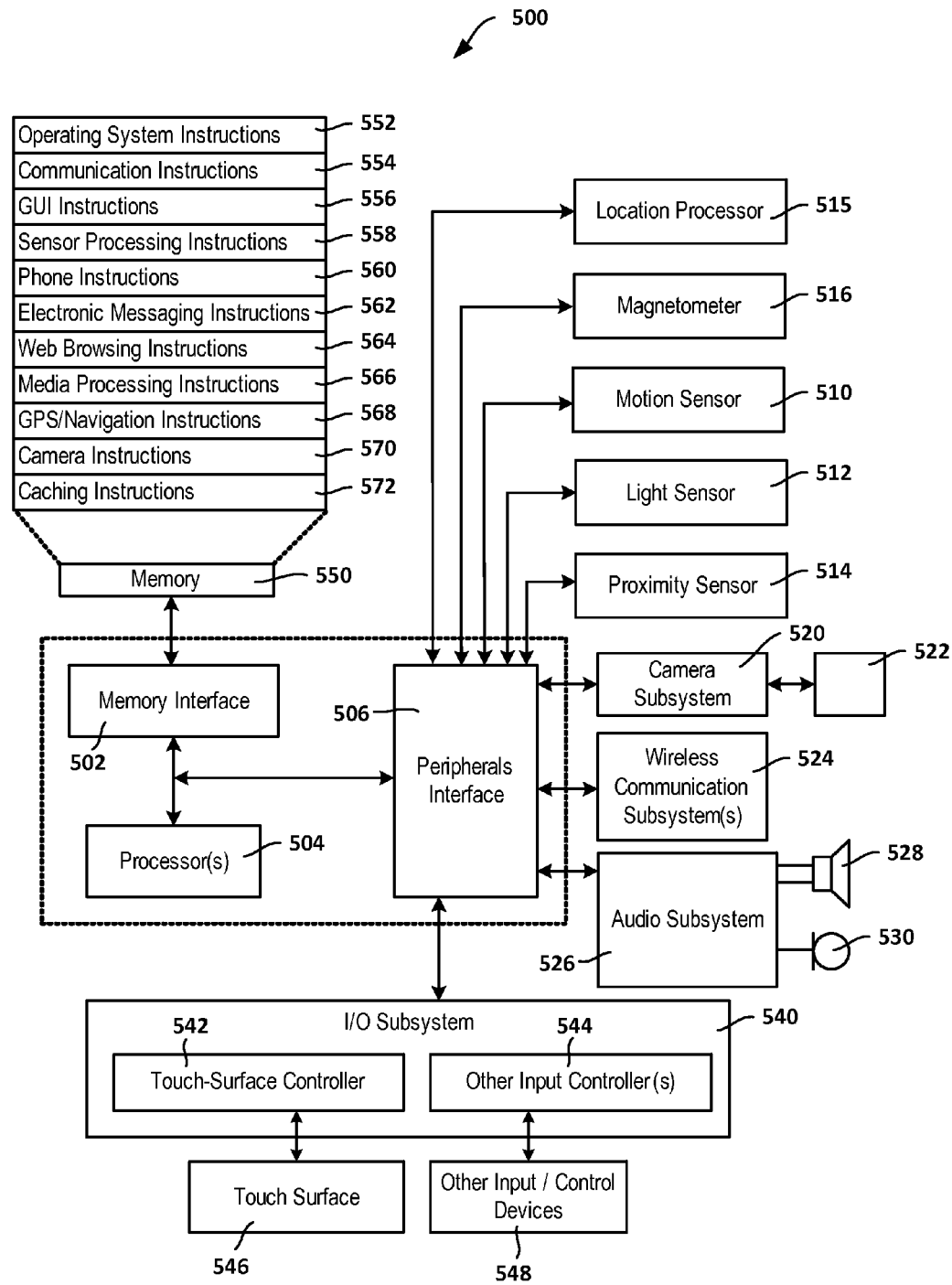
FIG. 5 is a block diagram of example client device architecture for implementing the features and processes described in reference to FIGS. 1-4.

FIG. 5 is a block diagram of example architecture of a client computer (e.g., one or more of the devices 102a-d described in reference to FIGS. 1A-D). Architecture 500 may be implemented in any device for generating the features described in reference to FIGS. 1A-D, including but not limited to portable computers, smart phones and tablet computers, game consoles, wearable computers and the like. Architecture 500 may include memory interface 502, data processor(s), image processor(s) or central processing unit(s) 504, and peripherals interface 506. Memory interface 502, processor(s) 504 or peripherals interface 506 may be separate components or may be integrated in one or more integrated circuits. One or more communication buses or signal lines may couple the various components.

Sensors, devices, and subsystems may be coupled to peripherals interface 506 to facilitate multiple functionalities. For example, motion sensor 510, light sensor 512, and proximity sensor 514 may be coupled to peripherals interface 506 to facilitate orientation, lighting, and proximity functions of the device. For example, in some implementations, light sensor 512 may be utilized to facilitate adjusting the brightness of touch surface 546. In some implementations, motion sensor 510 (e.g., an accelerometer, gyros) may be utilized to detect movement and orientation of the device. Accordingly, display objects or media may be presented according to a detected orientation (e.g., portrait or landscape).

Other sensors may also be connected to peripherals interface 506, such as a temperature sensor, a biometric sensor, or other sensing device, to facilitate related functionalities.

Location processor 515 (e.g., GPS receiver chip) may be connected to peripherals interface 506 to provide georeferencing. Electronic magnetometer 516 (e.g., an integrated circuit chip) may also be connected to peripherals interface 506 to provide data that may be used to determine the direction of magnetic North. Thus, electronic magnetometer 516 may be used with an electronic compass application.

Camera subsystem 520 and an optical sensor 522, e.g., a charged coupled device (CCD) or a complementary metal-oxide semiconductor (CMOS) optical sensor, may be utilized to facilitate camera functions, such as recording photographs and video clips.

Communication functions may be facilitated through one or more communication subsystems 524. Communication subsystem(s) 524 may include one or more wireless communication subsystems. Wireless communication subsystems 524 may include radio frequency receivers and transmitters and/or optical (e.g., infrared) receivers and transmitters. Wired communication system may include a port device, e.g., a Universal Serial Bus (USB) port or some other wired port connection that may be used to establish a wired connection to other computing devices, such as other communication devices, network access devices, a personal computer, a printer, a display screen, or other processing devices capable of receiving or transmitting data.

The specific design and implementation of the communication subsystem 524 may depend on the communication network(s) or medium(s) over which the device is intended to operate. For example, a device may include wireless communication subsystems designed to operate over a global system for mobile communications (GSM) network, a GPRS network, an enhanced data GSM environment (EDGE) network, 802.x communication networks (e.g., Wi-Fi, Wi-Max), code division multiple access (CDMA) networks, NFC and a Bluetooth™ network. Wireless communication subsystems 724 may include hosting protocols such that the device may be configured as a base station for other wireless devices. As another example, the communication subsystems may allow the device to synchronize with a host device using one or more protocols, such as, for example, the TCP/IP protocol, HTTP protocol, UDP protocol, and any other known protocol.

Audio subsystem 526 may be coupled to a speaker 528 and one or more microphones 530 to facilitate voice-enabled functions, such as voice recognition, voice replication, digital recording, and telephony functions.

I/O subsystem 540 may include touch controller 542 and/or other input controller(s) 544. Touch controller 542 may be coupled to a touch surface 546. Touch surface 546 and touch controller 542 may, for example, detect contact and movement or break thereof using any of a number of touch sensitivity technologies, including but not limited to capacitive, resistive, infrared, and surface acoustic wave technologies, as well as other proximity sensor arrays or other elements for determining one or more points of contact with touch surface 546. In one implementation, touch surface 546 may display virtual or soft buttons and a virtual keyboard, which may be used as an input/output device by the user.

Other input controller(s) 544 may be coupled to other input/control devices 548, such as one or more buttons, rocker switches, thumb-wheel, infrared port, USB port, and/or a pointer device such as a stylus. The one or more buttons (not shown) may include an up/down button for volume control of speaker 528 and/or microphone 530.

In some implementations, device 500 may present recorded audio and/or video files, such as MP3, AAC, and MPEG video files. In some implementations, device 700 may include the functionality of an MP3 player and may include a pin connector for tethering to other devices. Other input/output and control devices may be used.

Memory interface 502 may be coupled to memory 550. Memory 550 may include high-speed random access memory or non-volatile memory, such as one or more magnetic disk storage devices, one or more optical storage devices, or flash memory (e.g., NAND, NOR). Memory 550 may store operating system 552, such as Darwin, RTXC, LINUX, UNIX, OS X, WINDOWS, or an embedded operating system such as VxWorks. Operating system 552 may include instructions for handling basic system services and for performing hardware dependent tasks. In some implementations, operating system 552 may include a kernel (e.g., UNIX kernel).

Memory 550 may also store communication instructions 754 to facilitate communicating with one or more additional devices, one or more computers or servers, including peer-to-peer communications, as described in reference to FIGS. 1A-D. Communication instructions 554 may also be used to select an operational mode or communication medium for use by the device, based on a geographic location (obtained by the GPS/Navigation instructions 568) of the device. Memory 550 may include graphical user interface instructions 556 to facilitate graphic user interface processing, including a touch model for interpreting touch inputs and gestures; sensor processing instructions 558 to facilitate sensor-related processing and functions; phone instructions 560 to facilitate phone-related processes and functions; electronic messaging instructions 562 to facilitate electronic-messaging related processes and functions; web browsing instructions 564 to facilitate web browsing-related processes and functions; media processing instructions 566 to facilitate media processing-related processes and functions; GPS/Navigation instructions 568 to facilitate GPS and navigation-related processes; camera instructions 570 to facilitate camera-related processes and functions; and other instructions 572 for performing some or all of the caching processes, as described in reference to FIGS. 1-4.

Each of the above identified instructions and applications may correspond to a set of instructions for performing one or more functions described above. These instructions need not be implemented as separate software programs, procedures, or modules. Memory 550 may include additional instructions or fewer instructions. Furthermore, various functions of the device may be implemented in hardware and/or in software, including in one or more signal processing and/or application specific integrated circuits (ASICs).

Example Server Architecture

Figure 6:
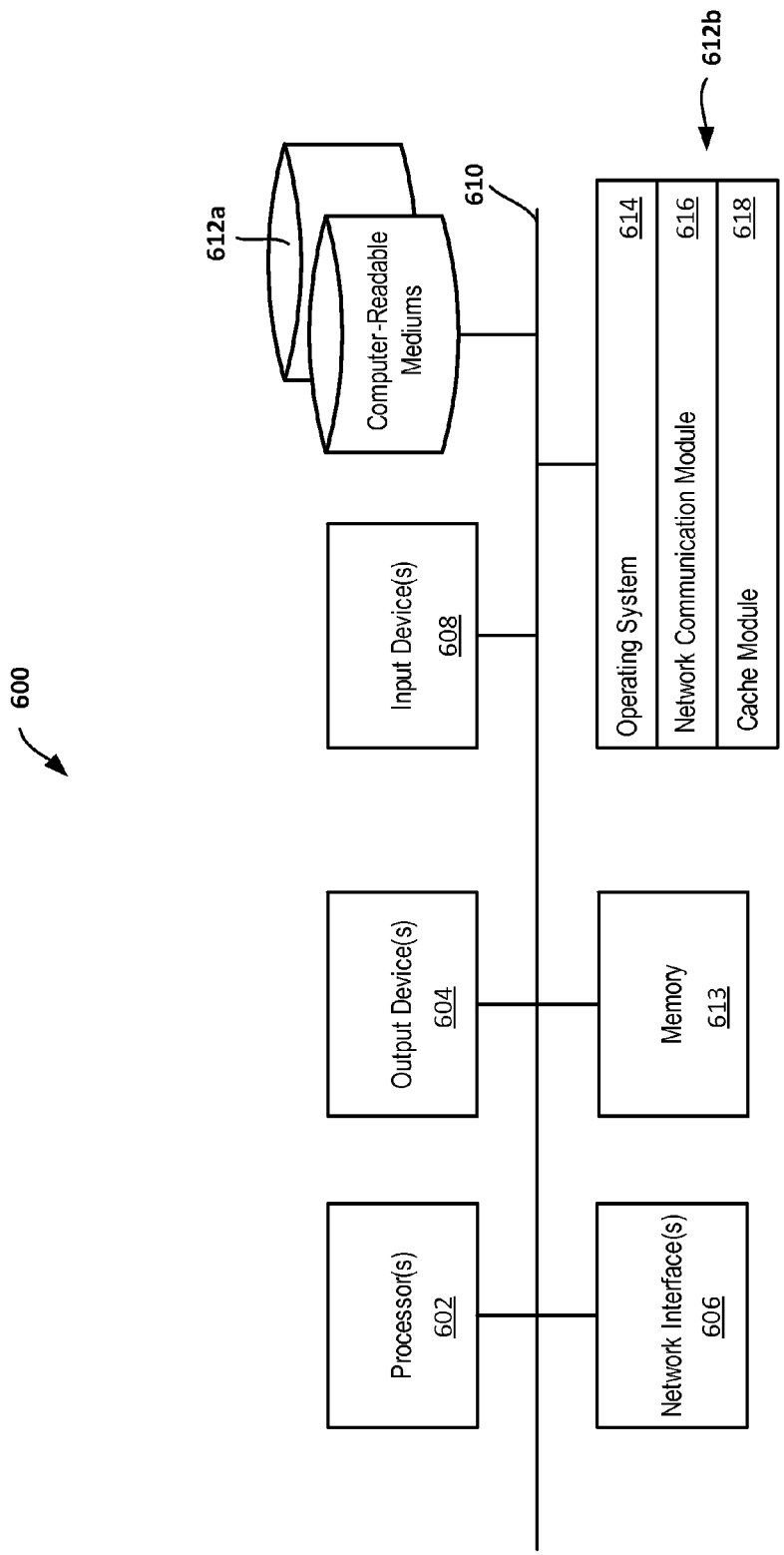
FIG. 6 is a block diagram of example server computer architecture for implementing the features and processes described in reference to FIGS. 1-4.

FIG. 6 is a block diagram of example architecture for a server computer (e.g., one or more of the devices 102*a-d* described in FIGS. 1A-D). Other architectures are possible, including architectures with more or fewer components. In some implementations, architecture 600 includes one or more processors 602 (e.g., dual-core Intel® Xeon® Processors), one or more output devices 604 (e.g., LCD), one or more network interfaces 606, one or more input devices 608 (e.g., mouse, keyboard, touch-sensitive display) and one or more computer-readable mediums 612*a-b* and memory 613 (e.g., RAM, ROM, SDRAM, hard disk, optical disk, flash memory, etc.). These components can exchange communications and data over one or more communication channels 610 (e.g., buses), which can utilize various hardware and software for facilitating the transfer of data and control signals between components.

The term "computer-readable medium" refers to any medium that participates in providing instructions to processor 602 for execution, including without limitation, non-volatile media (e.g., optical or magnetic disks), volatile media (e.g., memory) and transmission media. Transmission media includes, without limitation, coaxial cables, copper wire and fiber optics.

Computer-readable mediums 612*a-b* or memory 613 can further include operating system 614 (e.g., Mac OS® server, Windows® NT server), network communication module 816, and a cache module 618. Operating system 614 can be multi-user, multiprocessing, multitasking, multithreading, real time, etc. Operating system 614 performs basic tasks, including but not limited to: recognizing input from and providing output to devices 608, 604; keeping track and managing files and directories on computer-readable mediums 612*a-b* and memory 613; controlling peripheral devices; and managing traffic on the one or more communication channels 610. Network communications module 616 includes various components for establishing and maintaining network connections (e.g., software for implementing communication protocols, such as TCP/IP, HTTP, etc.). Cache module 618 stores data so that future requests for that data can be served faster. For example, caching module 618 can include be used to implement the caches 110*a-c* of FIG. 1C or the caches 200 of FIGS. 2A-C and FIGS. 3A-B.

Architecture 600 can be included in any computer device, including one or more server computers each having one or more processing cores. Architecture 600 can be implemented in a parallel processing or peer-to-peer infrastructure or on a single device with one or more processors. Software can include multiple software components or can be a single body of code.

The features described may be implemented in digital electronic circuitry or in computer hardware, firmware, software, or in combinations of them. The features may be implemented in a computer program product tangibly embodied in an information carrier, e.g., in a machine-readable storage device, for execution by a programmable processor; and method steps may be performed by a programmable processor executing a program of instructions to perform functions of the described implementations by operating on input data and generating output.

The described features may be implemented advantageously in one or more computer programs that are executable on a programmable system including at least one programmable processor coupled to receive data and instructions from, and to transmit data and instructions to, a data storage system, at least one input device, and at least one output device. A computer program is a set of instructions that may be used, directly or indirectly, in a computer to perform a certain activity or bring about a certain result. A computer program may be written in any form of programming language (e.g., Objective-C, Java), including compiled or interpreted languages, and it may be deployed in any form, including as a stand-alone program or as a module, component, subroutine, or other unit suitable for use in a computing environment.

Suitable processors for the execution of a program of instructions include, by way of example, both general and special purpose microprocessors, and the sole processor or one of multiple processors or cores, of any kind of computer. Generally, a processor will receive instructions and data from a read-only memory or a random access memory or both. The essential elements of a computer are a processor for executing instructions and one or more memories for storing instructions and data. Generally, a computer may communicate with mass storage devices for storing data files. These mass storage devices may include magnetic disks, such as internal hard disks and removable disks; magneto-optical disks; and optical disks. Storage devices suitable for tangibly embodying computer program instructions and data include all forms of non-volatile memory, including by way of example semiconductor memory devices, such as EPROM, EEPROM, and flash memory devices; magnetic disks such as internal hard disks and removable disks; magneto-optical disks; and CD-ROM and DVD-ROM disks. The processor and the memory may be supplemented by, or incorporated in, ASICs (application-specific integrated circuits).

To provide for interaction with an author, the features may be implemented on a computer having a display device such as a CRT (cathode ray tube) or LCD (liquid crystal display) monitor for displaying information to the author and a keyboard and a pointing device such as a mouse or a trackball by which the author may provide input to the computer.

The features may be implemented in a computer system that includes a back-end component, such as a data server or that includes a middleware component, such as an application server or an Internet server, or that includes a front-end component, such as a client computer having a graphical user interface or an Internet browser, or any combination of them. The components of the system may be connected by any form or medium of digital data communication such as a communication network. Examples of communication networks include a LAN, a WAN and the computers and networks forming the Internet.

The computer system may include clients and servers. A client and server are generally remote from each other and typically interact through a network. The relationship of client and server arises by virtue of computer programs running on the respective computers and having a client-server relationship to each other.

One or more features or steps of the disclosed embodiments may be implemented using an Application Programming Interface (API). An API may define on or more parameters that are passed between a calling application and other software code (e.g., an operating system, library routine, function) that provides a service, that provides data, or that performs an operation or a computation.

The API may be implemented as one or more calls in program code that send or receive one or more parameters through a parameter list or other structure based on a call convention defined in an API specification document. A parameter may be a constant, a key, a data structure, an object, an object class, a variable, a data type, a pointer, an array, a list, or another call. API calls and parameters may be implemented in any programming language. The programming language may define the vocabulary and calling convention that a programmer will employ to access functions supporting the API.

In some implementations, an API call may report to an application the capabilities of a device running the application, such as input capability, output capability, processing capability, power capability, communications capability, etc.

A number of implementations have been described. Nevertheless, it will be understood that various modifications may be made. Elements of one or more implementations may be combined, deleted, modified, or supplemented to form further implementations. As yet another example, the logic flows depicted in the figures do not require the particular order shown, or sequential order, to achieve desirable results. In addition, other steps may be provided, or steps may be eliminated, from the described flows, and other components may be added to, or removed from, the described systems. Accordingly, other implementations are within the scope of the following claims.

What is claimed is:

1. A method comprising:
receiving, by one or more processors, an indication to reclaim memory from a cache, the cache comprising a plurality of data buckets each configured to store one or more records and corresponding access bits;
selecting, by one or more processors, a data bucket from the cache;
processing, by one or more processors, the selected data bucket, wherein processing the selected data bucket comprises:
determining access bits of the selected data bucket that are clear, and expunging data records corresponding to those access bits from the cache; and
determining access bits of the selected data bucket that are set and do not correspond to records to be retrieved in response to outstanding requests by a process utilizing the cache, and clearing those access bits; and
repeating selecting and processing data buckets until a stop criterion is satisfied.

2. The method of claim 1, wherein processing the selected data bucket further comprises:
determining access bits of the selected data bucket that are set and clearing those access bits, based on an indication of a memory constraint.

3. The method of claim 2, wherein the memory constraint corresponds to a desired number of records stored in the cache.

4. The method of claim 2, wherein the memory constraint corresponds to a desired amount of memory that is allocated to the cache.

5. The method of claim 1, wherein the cache is a domain name system cache.

6. The method of claim 1, wherein the cache is a multicast domain name system cache.

7. The method of claim 1, wherein the cache comprises a hash table, and wherein each bucket of the cache corresponds to an output of a hash function.

8. The method of claim 1, wherein each bucket comprises a linked list.

9. The method of claim 1, wherein selecting a data bucket from the cache comprises selecting a random data bucket from the cache, and
wherein repeating selecting and processing data buckets until a stop criterion is satisfied comprises repeating selecting and processing random data buckets until a stop criterion is satisfied.

10. The method of claim 9, wherein selecting a random data bucket from the cache comprises selecting a random data bucket based on an output of a pseudo-random number generator.

11. The method of claim 10, where the output of the pseudo-random number generator corresponds to a substantially uniform probability distribution.

12. The method of claim 1, wherein each record comprises a resource name and a resource location.

13. The method of claim 12, wherein the resource location is an internet protocol address.

14. The method of claim 1, wherein the stop criterion corresponds to a desired number of records stored in the cache.

15. The method of claim 1, wherein the stop criterion corresponds to a desired amount of memory that is allocated to the cache.

16. The method of claim 1, wherein the data bucket is selected at random from the cache, and
wherein processing the selected data bucket comprises:
determining access bits of the randomly selected data bucket that are clear, and expunging data records corresponding to those access bits from the cache; and
determining access bits of the randomly selected data bucket that are set and do not correspond to records to be retrieved in response to outstanding requests by the process utilizing the cache, and clearing those access bits.

17. The method of claim 1, wherein processing the selected data bucket further comprises:
comparing each record of the selected data bucket to a list of outstanding requests; and
determining records having first data items matching one or more second data items of the list of outstanding requests.

18. The method of claim 17, wherein the first data items and the second data items each comprise a respective indication of a resource name or service.

19. A non-transitory computer readable medium storing instructions operable to cause one or more processors to perform operations comprising:
receiving, by one or more processors, an indication to reclaim memory from a cache, the cache comprising a plurality of data buckets each configured to store one or more records and corresponding access bits;
selecting, by one or more processors, a data bucket from the cache;
processing, by one or more processors, the selected data bucket, wherein processing the selected data bucket comprises:

determining access bits of the selected data bucket that are clear, and expunging those access bits and corresponding data records from the cache; and determining access bits of the selected data bucket that are set and do not correspond to records to be retrieved in response to outstanding requests by a system utilizing the cache, and clearing those access bits; and repeating selecting and processing data buckets until a stop criterion is satisfied.

20. The non-transitory computer readable medium of claim 19, wherein processing the selected data bucket further comprises:
determining access bits of the selected data bucket that are set and clearing those access bits, based on an indication of a memory constraint.

21. The non-transitory computer readable medium of 20, wherein the memory constraint corresponds to a desired number of records stored in the cache.

22. The non-transitory computer readable medium of claim 20, wherein the memory constraint corresponds to a desired amount of memory that is allocated to the cache.

23. The non-transitory computer readable medium of claim 19, wherein the cache is a domain name system cache.

24. The non-transitory computer readable medium of claim 19, wherein the cache is a multicast domain name system cache.

25. The non-transitory computer readable medium of claim 19, wherein the cache comprises a hash table, and wherein each bucket of the cache corresponds to an output of a hash function.

26. The non-transitory computer readable medium of claim 19, wherein each bucket comprises a linked list.

27. The non-transitory computer readable medium of claim 19, wherein selecting a data bucket from the cache comprises selecting a random data bucket from the cache, and
wherein repeating selecting and processing data buckets until a stop criterion is satisfied comprises repeating selecting and processing random data buckets until a stop criterion is satisfied.

28. The non-transitory computer readable medium of claim 27, wherein selecting a random data bucket from the cache comprises selecting a random data bucket based on an output of a pseudo-random number generator.

29. The non-transitory computer readable medium of claim 28, where the output of the pseudo-random number generator corresponds to a substantially uniform probability distribution.

30. The non-transitory computer readable medium of claim 19, wherein each record comprises a resource name and a resource location.

31. The non-transitory computer readable medium of claim 30, wherein the resource location is an internet protocol address.

32. The non-transitory computer readable medium of claim 19, wherein the stop criterion corresponds to a desired number of records stored in the cache.

33. The non-transitory computer readable medium of claim 19, wherein the stop criterion corresponds to a desired amount of memory that is allocated to the cache.

34. A system comprising:
one or more processors; and
non transitory computer readable medium storing instructions operable to cause one or more processors to perform operations comprising:
receiving, by one or more processors, an indication to reclaim memory from a cache, the cache comprising a plurality of data buckets each configured to store one or more records and corresponding access bits;
selecting, by one or more processors, a data bucket from the cache;
processing, by one or more processors, the selected data bucket, wherein processing the selected data bucket comprises:
determining access bits of the selected data bucket that are clear, and expunging those access bits and corresponding data records from the cache; and
determining access bits of the selected data bucket that are set and do not correspond to records to be retrieved in response to outstanding requests by a system utilizing the cache, and clearing those access bits; and
repeating selecting and processing data buckets until a stop criterion is satisfied.

35. The system of claim 34, wherein processing the selected data bucket further comprises:
determining access bits of the selected data bucket that are set and clearing those access bits, based on an indication of a memory constraint.

36. The system of claim 35, wherein the memory constraint corresponds to a desired number of records stored in the cache.

37. The system of claim 35, wherein the memory constraint corresponds to a desired amount of memory that is allocated to the cache.

38. The system of claim 34, wherein the cache is a domain name system cache.

39. The system of claim 34, wherein the cache is a multicast domain name system cache.

40. The system of claim 34, wherein the cache comprises a hash table, and wherein each bucket of the cache corresponds to an output of a hash function.

41. The system of claim 34, wherein each bucket comprises a linked list.

42. The system of claim 34, wherein selecting a data bucket from the cache comprises selecting a random data bucket from the cache, and
wherein repeating selecting and processing data buckets until a stop criterion is satisfied comprises repeating selecting and processing random data buckets until a stop criterion is satisfied.

43. The system of claim 42, wherein selecting a random data bucket from the cache comprises selecting a random data bucket based on an output of a pseudo-random number generator.

44. The system of claim 43, where the output of the pseudo-random number generator corresponds to a substantially uniform probability distribution.

45. The system of claim 34, wherein each record comprises a resource name and a resource location.

46. The system of claim 45, wherein the resource location is an internet protocol address.

47. The system of claim 34, wherein the stop criterion corresponds to a desired number of records stored in the cache.

48. The system of claim 34, wherein the stop criterion corresponds to a desired amount of memory that is allocated to the cache.

* * * * *

UNITED STATES PATENT AND TRADEMARK OFFICE
CERTIFICATE OF CORRECTION

PATENT NO. : 9,558,122 B2  
APPLICATION NO. : 14/290879  
DATED : January 31, 2017  
INVENTOR(S) : Kristen A. McIntyre Page 1 of 1

It is certified that error appears in the above-identified patent and that said Letters Patent is hereby corrected as shown below:

In the Claims

In Claim 11, Column 16, Line 21, delete "where" and insert -- wherein --.

In Claim 21, Column 17, Line 17, after "of" insert -- claim --.

In Claim 29, Column 17, Line 47, delete "where" and insert -- wherein --.

In Claim 34, Column 17, Line 64, delete "non transitory" and insert -- non-transitory --.

In Claim 44, Column 18, Line 53, delete "where" and insert -- wherein --.

Signed and Sealed this  
Fourth Day of April, 2017

Michelle K. Lee  
*Director of the United States Patent and Trademark Office*